Patented Feb. 17, 1948

2,436,329

UNITED STATES PATENT OFFICE 2,436,329

PHENOL FORMALDEHYDE RESIN-GLYCININ PROTEIN EMULSION

Philip K. Porter, Pittsburgh, Pa., assignor to Westinghouse Electric Corporation, East Pittsburgh, Pa., a corporation of Pennsylvania No Drawing. Application March 24, 1942, Serial No. 435,970

2 Claims. (Cl. 260—7)

This invention relates to resinous compositions comprising partially reacted phenol-aldehyde resins and a fibrous filler, methods of preparing compositions of this type and the product produced by curing the compositions.

It has been proposed heretofore to combine a mixture of fibrous material with potentially reactive resins in a beater apparatus, the materials being so distributed that upon dewatering the fibrous furnish and the resin, a composition suitable for molding under heat and pressure into members is obtained. For instance, the patent to Cheetham No. 1,855,384 discloses that an emulsion of a phenolic-resin may be prepared and added to a furnish in a beater and, upon breaking the emulsion, the resin is precipitated about the fibers and the mixture may be dewatered by running on a screen and forming sheets.

The fundamental defect in proposals of this kind which so far has rendered the processes commercially impractical resides in the fact that in the precipitation of the phenolic resin upon breaking the emulsion, the resin particles become sticky and adhere to the beating apparatus. Furthermore, the resin particles remain quite sticky and gummy and when being run onto a screen or other device capable of dewatering the pulp, the gummy resin particles clog up the screens and other apparatus so that in a short time the sheet forming apparatus is rendered inoperative.

In addition to the undesirable physical properties of the precipitated resin, such a gumminess, the particles of resin are exposed to the atmosphere, and being in a potentially reactive state, with an extensive exposed surface, their relative greenness, that is moldability and flow under heat and pressure, decreases with great rapidity. Therefore, sheets formed from the fibrous pulp and the resin cannot be stored and must be immediately molded, otherwise weak products with blotchy surfaces due to poor resin distribution and low greenness are obtained. Other defects in the prior art suggestions of preparing compositions from fibrous furnish and resin emulsions are inherent and render the process impractical to such an extent that no moldings have been produced in any quantity in commercial practice by such process up to the present time.

This invention is closely related to the copending application of Philip K. Porter, Serial No. 435,969, filed March 24, 1942, and assigned to the same assignee as the present application.

The object of this invention is to provide for emulsifying phenol-aldehyde resins with a glycinin protein in amount sufficient to impart plasticity to the phenolaldehyde resin when molding with fibrous material.

Another object of this invention is to provide for finely distributing in a furnish particles of reacted phenolic resin in a non-sticky state and plasticizing proteins for the resin in sufficient amount to impart improved moldability of the composition.

Other objects of the invention will be in part obvious and will in part appear hereinafter.

According to this invention, these defects, particularly the sticky and gummy nature of the precipitated resin dispersoid and the rapid deterioration in greenness, can be avoided and highly satisfactory results produced by employing a particular type of protein in preparing an emulsion of resin. In particular, it has been discovered that the proteins should be glycinins which have been derived from a proteinaceous source, particularly from soybeans, in such a manner that the protein has undergone as little change as possible during the process of isolation. Substantially unmodified glycinin has been found to operate very successfully in the process. Other proteins of a similar nature which have been subjected to extraction processes which modify the structure of the glycinin only to a slight extent have also been found to give satisfactory results.

The characteristics of the glycinin proteins suitable for the purpose of this invention which serve to distinguish them from other proteins which do not function as well are as follows: Preferred glycinin proteins have an isoelectric point at a pH of about 4.3 to 4.7. In water at this pH the protein reaches its minimum solubility. A further characteristic of the preferred glycinin protein is its relative solubility. Upon adding 45 grams of the glycinin protein to 400 cc. of distilled water at 25° C. at a pH of 8.5 secured with dilute sodium hydroxide, with stirring during the addition, the maximum solubility occurs at a concentration ranging from 2% to 20%. In the case of a protein which has been obtained with a minimum of modification from a source thereof, the solubility under the above test will vary from 6½% to 8%. In the case of a slightly more modified glycinin protein, the solubility was greater and the saturated solutions contained 12 to 15% of the protein. Viscosity tests of the preferred types of glycinin proteins were made by dissolving 30 grams of protein in 400 cc. of distilled water rendered alkaline to a pH of 8.5 with sodium hydroxide, and at 25° C. After being clarified of insoluble and undissolved fractions by centrifuging, at the end of two hours, the solutions showed a viscosity varying from 1 to 40 centipoises. The least modified proteins had viscosities ranging from 20 to 40 centipoises. Other slightly modified glycinin proteins operative in the process formed similar solutions having a viscosity of from 1 centipoise and upward. The concentration of protein in the clarified solutions employed as the basis for viscosity tests were from 5% to 7% based on the factor (percent of N) × 6.25.

The glycinin proteins need not be free from extraneous portions of the material from which it has been derived. It has been found that from 1% to 30% insoluble matter may be present in the protein without untoward effects resulting. These relatively insoluble constituents do not function as do the soluble protein portions and accordingly allowance must be made by adding greater quantity of proteins in the process.

The preferred glycinin proteins are available commercially. For example, a suitable protein is sold to the trade under the name of alpha soybean protein. Other proteins having the properties specified herein have been prepared by manufacturers and have been employed in the process with successful results being obtained.

A characteristic of the protein is its reaction with phenol-aldehyde resin being subjected to heat at temperatures whereby the phenol-aldehyde resin becomes molten or liquefied immediately prior to the C-stage. The protein in reacting with the molten resin confers plasticizing characteristics on the resin whereby its flow is materially increased. Therefore, the protein has other advantages in addition to the aforementioned function of emulsifying the resin. In some cases, it may be desirable to add much larger amounts of protein, such as the glycinin proteins referred to herein, to the aqueous medium over and above what is necessary for emulsifying the resin. These additional quantities of protein will be beneficial in increasing the plasticity of the phenol-aldehyde resin during the molding process in which the phenolic resin is converted to the C-stage.

One of the undesirable features heretofore inherent in the process of dispersing resins in a furnish in a beater has been the fact that the product produced from the beater furnish on molding under heat and pressure has had an uneven resin distribution. The surfaces of phenolic members have been mottled. In places the fibers have been clearly lacking in sufficient resin binder while in other sections an excess of phenolic resin has apparently been present. This has required special resin applications or surface treatment with additional phenolics in order to obtain good surface properties. However, the body of the fibrous member has not been rendered stronger by any surface treatment of the fibrous composition. Throughout the body of such molded material there will be found areas deficient in resin and other areas with excessive resin. Not only are the mechanical characteristics, such as strength and elasticity, impaired by the non-uniform distribution of resin, but the chemical properties and electrical properties suffer because of the non-uniform impregnation. Moisture absorption, for example, is high.

However, with sufficient amounts of proteinaceous material present in the distributed resin particles among the fibers, greenness is so improved that the resin will flow considerable distances from its original particle in the fibrous furnish and, therefore, both the surface and the body of the molded member are much more uniformly and thoroughly impregnated. The additional protein material is of further value, in that it supplements the phenol-aldehyde resin as a binder and thereby additional strength is introduced into the material molded therefrom.

In preparing an emulsion to be introduced into a beater along with a fibrous furnish, a quantity of water is rendered alkaline to a pH of from 8.5 to 11 or even higher by the addition of an alkali or other basic substances such as amines. Ammonium hydroxide is particularly good for this purpose, since it peptizes the glycinin protein somewhat better than other alkali. The alkaline state is necessary in order to peptize the protein. The protein is introduced into the alkaline aqueous solution at room temperature or slightly higher and thoroughly agitated until it is substantially dissolved. A phenol-aldehyde type resin varnish, preferably in a water soluble solvent, is introduced into the aqueous protein solution in fine streams and subjected to mechanical forces to break up the resin into fine particles. A colloid mill or a gear pump is a suitable means for breaking up the resin into a sufficiently fine state. The resin will lose solvent rapidly to the water and form minute particles which are emulsified in the presence of the protein. It is in the form of a stable emulsion which may be stored for a period of a month or more without breaking.

The emulsion is a thick fluid mixture in which the aqueous medium consists of water and the resin solvent and perhaps some protein. The aqueous medium constitutes the continuous phase of the emulsion while the suspended resin particles protected by the protein constitute the dispersed phase. Since the water is the continuous phase, it may be greatly diluted without the emulsion breaking providing, of course, that the alkalinity is not so greatly reduced that the protein loses its protective characteristics.

When peptized, the protein acquires characteristics rendering it a good emulsifying agent and protective colloid. Upon the introduction of the phenolic resin into a peptized protein solution, the fine resin particles acquire a protective film or layer of protein which prevents the resin particles from coagulating or becoming sticky. The resin particles are so fine that they remain suspended and do not settle out.

In preparing the emulsion of resin, protein and water, it has been found that alkaline conditions are necessary in order to properly peptize the glycinin protein. Alkalis, containing the hydroxyl group, or other substances capable of acquiring hydroxyl groups upon being put into water, will be satisfactory for the purpose. The ammonium radical is also a good peptizing agent. Accordingly, ammonium compounds of all types may be added to the water in an alkaline condition at a pH of 8.5 or higher to produce satisfactory peptization. Since ammonium hydroxide combines both the hydroxyl grouping and the ammonium group it is a more efficient peptizing agent than an equivalent amount of many other materials.

In many cases, the emulsion may include conventional emulsifying agents, for example soaps and long chain aliphatic hydrocarbons, for example oleic acid, stearic acid and palmitic acid. Sodium soaps, ammonium soaps and potassium soaps of oleic, stearic and palmitic acids are examples of suitable soaps for this purpose. A small percentage of a soap or long chain hydrocarbon added to the water prior to the addition of the resin will assist in forming an emulsion of the resin.

Phenol-aldehyde resins to be used in producing an emulsion may be prepared by reacting phenols, for example, one mol of cresylic acid, meta-para cresol or other phenol with from less than 0.8 mols to 1.7 mols, or even higher, of an aldehyde such as formaldehyde or other methylene containing body. The phenol and aldehyde may be reacted in the presence of a catalyst, such as alkali hydroxides, phosphates, or carbonates, amines, acids and the like. The phenol aldehyde resin after reaction may be dehydrated by vacuum treatment or decantation. A thick resin composition in the A stage results which is soluble in ethyl alcohol or other solvent. Commonly, approximately an equal weight of alcohol is added to the resin in the vessel and a resin solution, or, as it is usually called in the art, a varnish, is produced. Since the solvent will enter into the water phase of the emulsion and later be greatly diluted in the water in a beater, its recovery is not feasible, and, therefore, the minimum of solvent necessary to produce a varnish is preferably employed. The main criterion for the solvent is solubility in water whereby the dispersed particles of resin in the emulsion are rendered free of solvent.

An emulsion satisfactory for the purpose of this invention was produced by adding 10 parts of concentrated ammonium hydroxide of a specific gravity of 0.90 to 140 parts of water and thereafter 20 parts of dry powdered glycinin protein derived from soybeans and without any substantial modification in its extraction and having the characteristic set forth hereinbefore was added to the ammoniated water. Approximately 160 parts of a cresylic acid-formaldehyde varnish composed of 80 parts by weight of solid resin and 80 parts of ethyl alcohol solvent was added to the aqueous medium containing the peptized protein. The phenolic resin varnish was added in a thin stream and subjected to mechanical forces in order to break up the resin varnish into fine particles. A colloid mill or a gear pump may be employed for this purpose. A convenient method of effecting the breakdown of the resin into the finest distribution is to withdraw the mixture from the bottom of a containing receptacle running it through a gear pump, for example, and discharging the material back into the top of the receptacle. Within a short period of time, the resin will be broken down into emulsion size particles. The emulsion will appear as a thick liquid. The specific example of emulsion so prepared contained approximately 25% of solid phenol-aldehyde resin and 6¼% of solid protein. The ratio of the weight of solid phenol-aldehyde to the weight of the protein accordingly was 4 to 1.

Protein may be added in larger proportions, for example, down to a 1 to 1 ratio relative to the phenol-aldehyde resin or even more. For the purpose of this invention, emulsions containing phenol aldehyde to protein in weight ratios of from 16 to 1 to 1 to 1 constitute the best materials. It will be appreciated that owing to the large amounts of protein, there will be no difficulty in preparing the emulsion. Satisfactory emulsions may be prepared from resin to protein ratios of from about 16 to 1 to 8 to 1. The emulsions prepared from larger protein ratios are very stable and will not break on standing for months. Therefore, the emulsions may be stored after preparation without any noticeable deterioration in the physical or chemical properties of the material.

In preparing the emulsion, it is desirable, as a matter of economy, to employ as small a quantity of water as is feasible since less material will be handled. It may be stated as a rough rule that at least 10 parts of water to every part of protein may be considered as a minimum ratio. In my copending patent application referred to herein, it has been pointed out that due to the greater proportion of resin than protein, the minimum amount of water required to produce a good emulsion depends on the resin solvents. In the instant application the higher protein content determines the water content.

In preparing an emulsion from 5 parts of protein, 160 parts of resin varnish composed of approximately 80 parts of phenol-aldehyde resin and 80 parts of solvent, and 10 parts of concentrated ammonium hydroxide, 90 parts of water produced a good emulsion which was easily pourable. With 70 parts of water in the same formula the emulsion did not form properly and a very thick mass unsuitable for the purpose of this invention resulted. Examples of satisfactory emulsions having a similar consistency and being easily pourable are found in the following table:

| Glycinin Protein | Resin Varnish | Water | NH₄OH |
|---|---|---|---|
| 10 | 160 | 140 | 10 |
| 20 | 160 | 250 | 10 |
| 30 | 160 | 300 | 10 |
| 40 | 160 | 450 | 10 |

The quantity of water may be increased almost indefinitely, but since the protein requires a certain degree of alkalinity for its peptization, and, therefore, excessive amounts of ammonium hydroxide or other peptizing agent will be required where the water is in excessive amounts, it is not advisable to exceed a 30 to 1 ratio of water to the protein. It will be appreciated that the water must be the continuous phase whereby the emulsion may be diluted with water in subsequent processing.

The fibrous filler to be combined with the phenol-aldehyde resin emulsion is put first into a beater containing water. A convenient and economical source of fibrous material is wood pulp. Pulp is added in small quantities to the beater to form a furnish until a concentration of pulp ranging from 2% to 8% is attained. Best results have been obtained, however, when the pulp concentration is from 4% to 6%. The 8% concentration is quite heavy to handle and, on the other hand, the handling of a 2% concentration is not as economical from a manufacturing standpoint.

Cellulosic pulp, in general, will be found to be most satisfactory for the purpose of the invention. This may include all types of wood pulp, shredded cloth, various plant fibers, and similar materials. Cellulose materials carry a negative charge, even when acid, and as will be shown this is an important characteristic in the successful functioning of the process. In addition, the fibrous material may be given predetermined properties by adding small amounts of inorganic material, preferably fibrous, such as asbestos.

As the fibrous furnish in the beater is subjected to beating in order to break up the fibers, the emulsion of resin prepared as described herein is introduced in a thin stream adjacent the beater cylinder. The emulsified particles of resin with their protective coating of protein will be uniformly distributed throughout the beater stock as the beating proceeds.

The normal proportions of resin to fiber as employed in the laminated plastics art will be found to be applicable to the molding material produced from the resin and fibrous furnish. Therefore 1.4 to 2.0 ratios or higher may be prepared and successfully molded to meet the requirements of the art.

The emulsion may be broken or precipitated at any time during the beating operation. It is preferred, however, to precipitate the emulsion soon after its thorough distribution in the beater by adding a precipitant. In general, the protective colloid of protein will cease functioning as the protective colloid for the emulsion when the beater liquid is made acid. The isoelectric point of the protein, at a pH of from 4.3 to 4.7, is the preferable condition for the beater liquid. Accordingly, an acid or an acidic substance capable of producing a pH of 4 or slightly higher is added. It is particularly undesirable to permit the pH to fall below 4 since the protein becomes gummy and sticky when so acidified and will adhere to the beater mechanism and produce an undesirable result. Suitable dispersants are strong mineral acids such as sulphuric acid or hydrochloric acid. In addition, compounds selected from aluminum sulphate, acid phosphates, acid tartrates, and the like, have functioned satisfactorily.

The reaction of the protein upon being acidified is twofold. The first change is a breaking of the emulsion. Further, as the isoelectric point is approached, the protein attaches itself to the resin particles and forms into a hard insoluble film or coating about the resin particles. This acid hardened protein coating protects the potentially reactive phenol-aldehyde resin from deterioration, and further prevents the formation of sticky or gummy masses of resin. Therefore, not only does the protein function to prevent the resin particles from agglomerating into masses unsuitable for molding purposes, but the protein likewise prevents the resin from adhering to the beater mechanism or going to waste.

In precipitating the emulsion with various agents, it has been found that aluminum sulphate is a highly efficient hardening and demulsifying agent. The protein forms a much harder film or coating when aluminum sulphate is used than with most other materials. On the other hand, the strong mineral acids maintain the acidity constant between a pH of 4 and 5 better than less strong acids. Therefore, for some purposes, it has been found that the use of a strong acid, for example, sulphuric acid, to bring the beater stock to a pH of below 7 and thereafter adding aluminum sulphate to attain a pH of from 4 to 5 is a desirable acidification step.

Under these conditions, the acid hardened glycinin protein coats the resin particles with a protective covering that keeps the resin in a reactible state while maintaining a predetermined greenness. The non-sticky nature of the fine resin particles so protected is a characteristic that was previously unattainable with art resin emulsifying materials. These features are highly important to successful results in the process. The appearance of the beater stock is that of a mass of fibers with finely pulverized brown sugar distributed therein, the protected resin particles having the appearance of brown sugar. For the purpose of this invention, a free draining pulp, such as is produced by one or two hours beating, has been found to be most satisfactory. More hydrated pulps secured by longer beating may however, be used.

Since the isoelectric point of cellulose is much below that of the attainable acidity in the beater, the fibers carry a negative charge and beating has a tendency to increase this negative charge. For this reason, cellulosic pulps are preferred for the purpose of the invention because a negative charged fibrous pulp is a necessary feature of the process. The acidified protein protected resin particles carry a positive electrical charge and accordingly adhere to the cellulose fibers. This electrical attraction causing adherence is vital in order to obtain a high resin recovery from the beater. Without adherence to the fibers, the resin particles would easily wash out and be lost. It will be appreciated that a high resin recovery is necessary in producing an efficient and economical process.

It is preferred to employ glycinin proteins in the large quantities over and above those necessary to emulsify the resin as hereinbefore disclosed in order to provide for a plasticizing agent for the resin during molding operations in preference to other proteins, because the glycinin proteins do not become gummy and sticky on acidifying. The large quantity of protein is advantageous furthermore in producing a much harder and more durable protecting coating about the particles of incompletely reacted resin. The resin will suffer less deterioration in storage after being moved from the beater when protected by these heavy and durable protein coatings.

In some cases it may be desirable initially to prepare an emulsion from phenolic resin with just sufficient glycinin protein to provide for the desirable emulsion and hardening characteristics, as disclosed in my copending patent application Serial No. 435,969. In general, these emulsions contain phenolaldehyde to protein ratios ranging from about 16 to 1 from 80 to 1. After the emulsion has been added to the beater and a thorough distribution of the resin and the fibrous furnish obtained additional protein, either the preferred glycinin proteins or those of a less desirable type obtainable from many sources, may be added to bring the ratio of phenol-aldehyde to protein to a value of less than 16:1 to 1:1. The additional protein may be added at any time up to the operations immediately preceding the forming of the fibrous furnish into flat sheets or preforms. More of the preferred glycinin proteins may be added separately at this stage. It will be appreciated that some of the less desirable proteins will tend to become somewhat gummy in the fibrous furnish when so added but due to the relatively small quantity present and also due to the fact that the resin particles are not gummy since they are coated with hardened glycinin protein, the additions of cheaper and less desirable proteins do not cause entirely unsatisfactory results.

The 2% to 8% beater stock is a heavy concentrated fibrous mass which is difficult to use in preparing sheets on paper-making machines or for preforming to other shapes. Therefore, for most purposes, the beater stock is diluted with water to a pulp concentration of about ½ to 1%. Such a thin fluid suspension of fibers and the adherent protected resin particles is well adapted for flowing onto the screens of paper-making machines or in building up shapes of all desirable kinds on perforated preformed members. During the processing, the beater stock is separated from the bulk of the water as the pulp-resin mixture is formed into predetermined shape. Preformed sheets or preforms of other shapes may be further treated by means of pressure, with or without heat at low temperatures, to remove most of the remaining quantities of water since water is undesirable in molding phenolic materials under heat and pressure to the infusible state.

The dried and dewatered sheets or preforms may be placed at any later time within heated molds and subjected to curing pressure and heat. Pressures of from 500 pounds to 2000 pounds per square inch or even higher at temperatures ranging from 125° C. to 200° C. may be applied to the mixture of fibers and the adherent protein phenol-aldehyde resin particles. The heat causes the phenol-aldehyde resin to melt and become liquid. In conjunction with the applied pressure, the protective protein envelope about each resin particle bursts and the liquid resin is distributed about the adjacent fibers. The protein reacts with the liquefied resin to produce a modified resin whereby an increase of binder is secured. The potentially reactive resin rapidly changes over from the liquid to the infusible or C-stage, and thereafter becomes effective as a solid binder between the fibers.

The large amount of protein present in the fibrous sheets or preforms adjacent the resin particles takes part in the curing reaction. The liquid phenol-aldehyde resin reacted with the protein produces an even more fluid material due to the plasticizing effect of the protein. The combined protein and phenol-aldehyde will tend to distribute itself further and more uniformly throughout the fibers than would the phenolic resin alone. In instances where the phenol-aldehyde resin would have an unsatisfactory greenness due to oxidation or other reasons, the protein will improve the greenness sufficiently to cause a satisfactory molded product to be produced. Therefore, under given conditions of resin to fiber ratio, the product having an excess of protein will be characterized by a more uniform surface appearance and better resistance to moisture. The body of the molded members will not have portions lacking sufficient phenolic binder as has occurred in prior art moldings.

The material produced by the use of large quantities of glycinin protein is characterized by a high resin recovery. In fact the resin recovery in practice has run 95% and higher of the total recoverable resin solids. It is believed that this degree of resin recovery is exceptional for a process employing such large quantities of water relative to the fiber and resin material present. It will be appreciated that the economy of the process is materially influenced by the amount of resin recovered.

In addition to the good resin recovery, there are other improvements mainly in the lack of gumming up of the beater mechanism. Furthermore, the screens or perforated members on which sheets or preforms are made will not be gummed up or clogged after a small number of fibrous members have been produced. This feature of the invention is highly desirable and renders the process practicable on a commercial scale.

While the preparation of emulsions by application of glycinin proteins has been specifically described in connection with phenol-aldehyde resins, emulsions may be similarly prepared from oil modified phenol-aldehyde resins such, for example, as tung oil-phenol-aldehyde condensates. Likewise other thermosetting resins such, for example, as furfural resins may be as readily emulsified for treatment with fibrous material in beaters.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. A resinous emulsion characterized by good stability over a period of days comprising, in combination, an aqueous medium at a pH of from about 8.5 to 11 comprising at least 97 parts by weight of water and 80 parts by weight of a water soluble organic solvent as the continuous phase, 80 parts by weight of a partially reacted thermosetting phenol-aldehyde resin in the alcohol soluble stage as the dispersed phase, the resin being soluble in the water soluble organic solvent, and an emulsifying agent and protective colloid for the dispersed phenol-aldehyde resin comprising a glycinin protein peptized with ammonium hydroxide, the ratio of weight of the solid phenol-aldehyde resin to the weight of the protein ranging from less than 16 to 1 to 1 to 1, the ratio of water to glycinin protein being at least 7.35 to 1, the glycinin protein derived from soybeans with a minimum of modification and characterized by an isoelectric point at a pH of 4.3 to 4.7 and soluble in water at a pH of 8.5 at 25° C. to produce saturated solutions at a concentration of 2% to 20%, the water not exceeding 30 times the weight of the glycinin protein.

2. A resinous emulsion characterized by good stability over a period of days comprising, in combination, an aqueous medium at a pH of from about 8.5 to 11 comprising at least 97 parts by weight of water having a minor proportion of a water soluble phenol-aldehyde solvent as the continuous phase, 80 parts by weight of a partially reacted thermosetting phenol-aldehyde resin in the alcohol soluble stage as the dispersed phase, the resin being soluble in the water soluble organic solvent, and an emulsifying agent and protective colloid for the dispersed phenol-aldehyde resin comprising a glycinin protein peptized with hydroxyl ions, the ratio of weight of the solid phenol-aldehyde resin to the weight of the protein ranging from less than 16 to 1 to 1 to 1, the ratio of water to glycinin protein being at least 7.35 to 1, the glycinin protein derived from soybeans with a minimum of modification and characterized by an isoelectric point at a pH of 4.3 to 4.7 and soluble in water at a pH of 8.5 at 25° C. to produce saturated solutions at a concentration of 2% to 20%, the water not exceeding 30 times the weight of the glycinin protein.

PHILIP K. PORTER.

REFERENCES CITED

The following references are of record in the file of this patent:

UNITED STATES PATENTS

| Number | Name | Date |
|---|---|---|
| 1,160,365 | Baekeland | Nov. 16, 1915 |

(Other references on following page)

UNITED STATES PATENTS

| Number | Name | Date |
|---|---|---|
| 1,855,384 | Cheetham | Apr. 26, 1932 |
| 1,976,433 | Cheetham | Oct. 9, 1934 |
| 1,997,868 | Levin | Apr. 16, 1935 |
| 2,022,004 | Larson | Nov. 26, 1935 |
| 2,027,090 | Carter | Jan. 7, 1936 |
| 2,058,085 | Kress | Oct. 20, 1936 |
| 2,066,857 | Rozema et al. | Jan. 5, 1937 |
| 2,068,926 | Nevin | Jan. 26, 1937 |
| 2,172,392 | Kress et al | Sept. 12, 1939 |
| 2,262,422 | Brother et al. | Nov. 11, 1941 |
| 2,264,732 | Weber | Dec. 2, 1941 |
| 2,271,620 | Brier et al. | Feb. 3, 1942 |
| 2,278,291 | Swan et al. | Mar. 31, 1942 |
| 2,311,244 | Novak | Feb. 16, 1943 |
| 2,325,302 | Britt | July 27, 1943 |
| 2,338,602 | Schur | Jan. 4, 1944 |

FOREIGN PATENTS

| Number | Country | Date |
|---|---|---|
| 293,232 | Great Britain | July 5, 1928 |

OTHER REFERENCES

Mattiello: Protective and Decorative Coatings, vol. III, 1943, pages 482 to 484.

Technical Association Papers Series 23 (1940), page 379.